(12) United States Patent
Achkinazi

(10) Patent No.: US 12,014,086 B2
(45) Date of Patent: Jun. 18, 2024

(54) HIGH AVAILABILITY IN NON-VOLATILE MEMORY EXPRESS (NVMe®) OVER TRANSMISSION CONTROL PROTOCOL (NVMe/TCP)

(71) Applicant: DELL PRODUCTS L.P., Round Rock, TX (US)

(72) Inventor: Igor Achkinazi, Northboro, MA (US)

(73) Assignee: DELL PRODUCT L.P., Round Rock, TX (US)

( * ) Notice: Subject to any disclaimer, the term of this patent is extended or adjusted under 35 U.S.C. 154(b) by 124 days.

(21) Appl. No.: 17/866,394

(22) Filed: Jul. 15, 2022

(65) Prior Publication Data
US 2024/0020061 A1 Jan. 18, 2024

(51) Int. Cl.
*H04L 67/14* (2022.01)
*G06F 3/06* (2006.01)

(52) U.S. Cl.
CPC .......... *G06F 3/0659* (2013.01); *G06F 3/0617* (2013.01); *G06F 3/0656* (2013.01); *G06F 3/067* (2013.01); *H04L 67/14* (2013.01)

(58) Field of Classification Search
CPC .... G06F 3/0659; G06F 3/0617; G06F 3/0656; G06F 3/067; H04L 67/14–148
See application file for complete search history.

(56) References Cited

U.S. PATENT DOCUMENTS

| | | | |
|---|---|---|---|
| 11,089,105 B1* | 8/2021 | Karumbunathan | ... G06F 16/275 |
| 11,507,391 B1* | 11/2022 | Liu | ........................ G06F 9/4416 |
| 2019/0004947 A1* | 1/2019 | Trika | ..................... G06F 3/0647 |
| 2020/0225863 A1* | 7/2020 | Veluswamy | .......... G06F 3/0647 |
| 2020/0341916 A1* | 10/2020 | Subbanna | ............ G06F 13/4282 |
| 2022/0345538 A1* | 10/2022 | Zinger | ....................... G06F 9/48 |
| 2023/0409243 A1* | 12/2023 | Markuze | ................ G06F 3/0655 |

FOREIGN PATENT DOCUMENTS

TW        202143035 A  * 11/2021    ......... G06F 13/1668

* cited by examiner

*Primary Examiner* — Alina A Boutah
(74) *Attorney, Agent, or Firm* — NORTH WEBER & BAUGH LLP

(57) ABSTRACT

Systems and methods herein save one or more parameters related to NVMe® data in one or more memory mapped files or in shared memory region(s). When a storage target experiences an interrupt event (e.g., loss of connectivity, system crash, application crash, etc.), the storage target may be restarted (e.g., a new instance formed in the case of a software-defined storage target) that uses the stored parameter data to recreate the controller context (e.g., NVMe® controller and TCP (transmission control protocol) connection), and the storage target may resend the last TCP acknowledgement, thereby causing the host to send or resend any NVMe/TCP data that follows the last successfully received NVMe/TCP data—thus, any data that the host sent during the storage target down time, which may have been lost, is re-sent. Embodiments keep a host unaware of a storage target interrupt and remove the need for TCP reestablishment.

20 Claims, 11 Drawing Sheets

400

| Controller ID |  |
|---|---|
| Controller Configuration Register | |
| Controller Status Register | |
| Keepalive Timeout | Number of IO queues |
| Namespace ID List Length | |
| Namespace ID-1 | |
| ... | |
| Namespace ID-*N* | |

| Admin Queue TCP context length | |
|---|---|
| Keepalive Timeout | Number of IO queues |
| TCP sequence number | |
| TCP ACK number | |
| TCP flags | TCP window size |
| Incomplete command TCP ACK-ed data length | |
| NVMe commands inflight data ... | |
| 1 IO Queue TCP data length | |
| 1 IO Queue TCP-related data ...<br>Incomplete command data and inflight NVMe commands ...) | |
| ... | |
| *N* IO Queue TCP data length | |
| *N* IO Queue TCP-related data ...<br>Incomplete command data and inflight NVMe commands ...) | |

FIG. 4

HIGH AVAILABILITY IN NON-VOLATILE MEMORY EXPRESS (NVMe®) OVER TRANSMISSION CONTROL PROTOCOL (NVMe/TCP)

BACKGROUND

A. Technical Field

The present disclosure relates generally to information handling system. More particularly, the present disclosure relates to systems and methods for providing high availability of storage systems.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are used to provide a number of services related to data storage and data acquisition. One of the relatively new standards in storage is non-volatile memory express over Fabrics (NVMe-oF™) with a new subset of NVMe® over Transmission Control Protocol (NVMe/TCP). One value of this new option is to have a common standard that allows application servers to access storage without having to install any special agents.

While these storage implementations provide improved storage functionality, they are not without problems. One problem is related to when a storage system has an interrupt event while interacting with a remote host. Consider by way of illustration, the network environment 100 depicted in FIG. 1.

Assume that Host A 105 has established a connection with the storage system 115 over network 110. As part of establishing a connection, there are connection parameters that are established. If the storage subsystem 115 experiences an interrupt event, it may need to reboot and go through the process of reestablishing the connection with the Host A 105. The process of reestablishing the connection can be quite involved and may result in significant delays and lost data. Because these storage systems can be critical or important services, reducing delays and lost data should be paramount.

Accordingly, it is highly desirable to find new, more efficient ways to handle interrupt events with dealing with data processing.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 4 depicts a single controller saved memory layout, according to embodiments of the present disclosure.

DETAILED DESCRIPTION OF EMBODIMENTS

Figure 1:
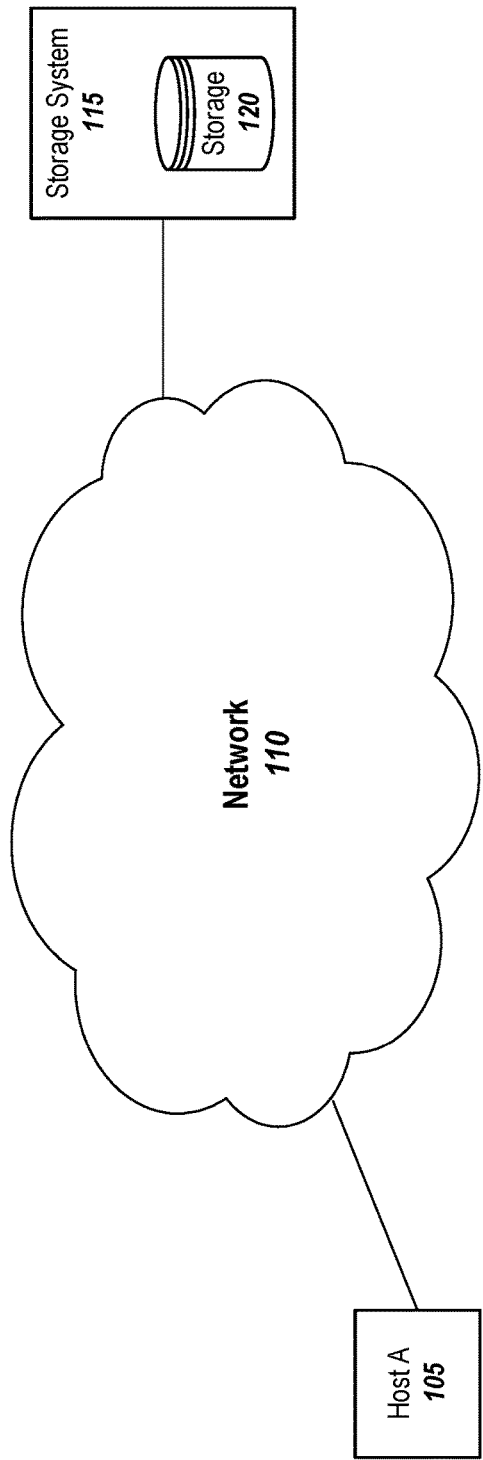
FIG. 1 ("FIG. 1") depicts an example network.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of NVMe and TCP, aspects of the present disclosure are not so limited. Accordingly, the aspects of the present disclosure may be applied or adapted for use in other contexts.

A. System Embodiments and Method Embodiments

As noted above, one of the relatively new standards in storage is non-volatile memory express over Fabrics (NVMe-oF™) with a new subset of NVMe over Transmission Control Protocol (NVMe/TCP). One implementation of NVMe/TCP is using software-defined elements. Consider, by way of illustration only, the system in FIG. 2.

Figure 2:
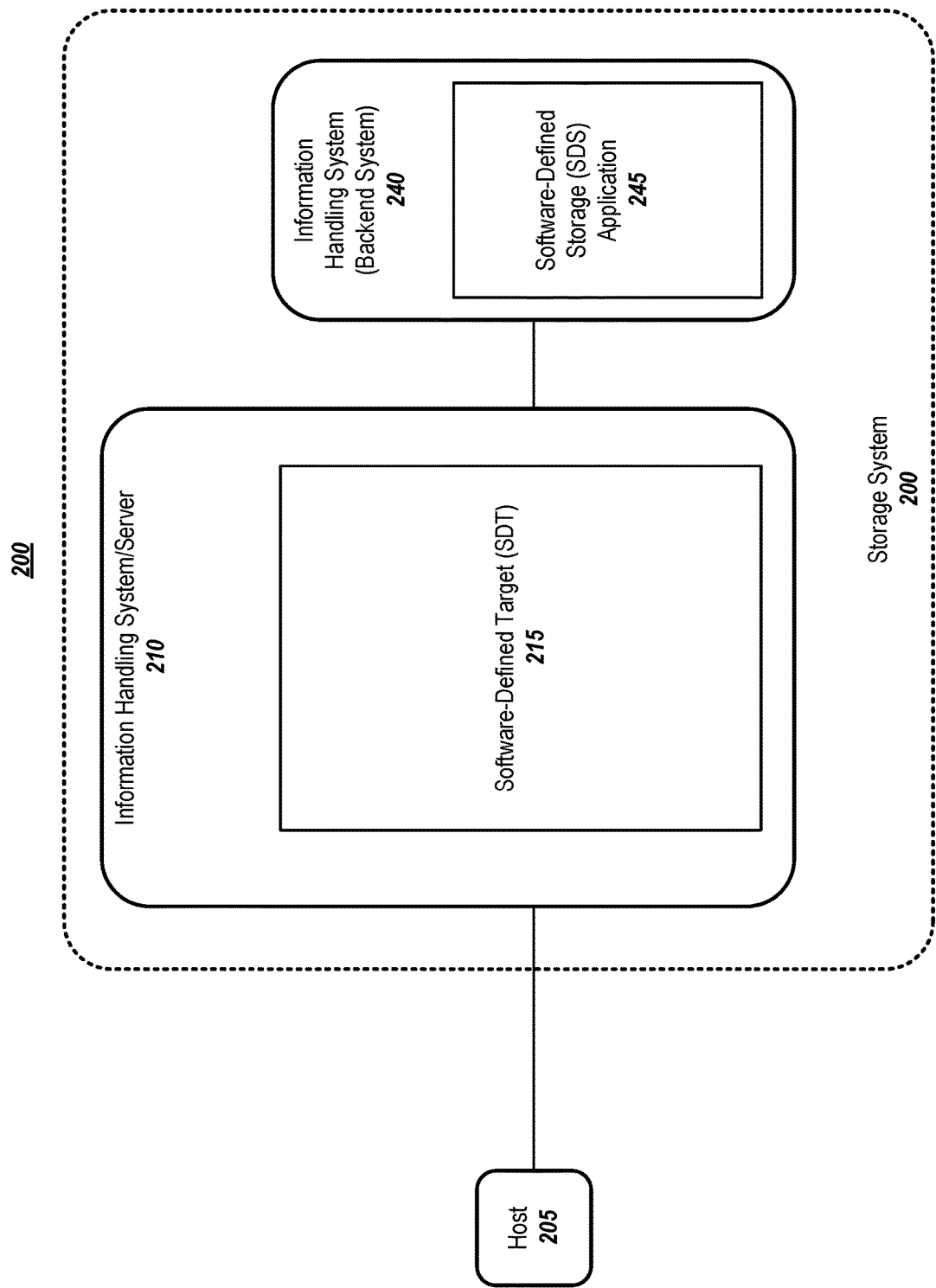
FIG. 2 depicts an example storage system, according to embodiments of the present disclosure.

FIG. 2 depicts an example storage system, according to embodiments of the present disclosure. In one or more embodiments, a storage system 200 may include a software-defined target (SDT) 215, that is operating on an information handling system/server 210. The SDT may be a Linux-based software-defined NVMe target, although other software-defined targets may be used. In one or more embodiments, it may be installed on an application host, and it may run as a daemon listening for incoming TCP connections from NVMe initiator hosts (e.g., host 205). The storage system 200 may also include a backend system 240, which may comprise one or more information handling systems, that connects to the storage target 215 via one or more connections to one or more software-defined storage applications/servers (SDS).

In one or more embodiments, an SDT 215 presents itself (e.g., to host 205) as a collection of NVMe controllers, wherein each has a set of TCP connections associated with one or more parameters—e.g., admin and input/output (TO) queues (TCP association). Each TCP connection may correspond to a single queue with request/response entries.

If the SDT 215 experiences an interrupt event (e.g., crashes, process stalls/hangs, system freezes, loss of connectivity, etc.) and reboots, the TCP connections disconnect from the host 205. Thus, the host 205 must reestablish all the connections and reallocate all resources once the SDT 215 comes back up again, which might take valuable time.

There have been attempted solutions to address this issue. One method involves multipath configuration and duplication of IO flows to a backup NVMe target. When a primary NVMe target crashes (and is rebooting), the NVMe/TCP connection to the primary NVMe target drops, and the backup NVMe target is put into operation to continue IOs without urgent need to reestablish TCP connections and NVMe controllers. Another option is a duplicate IO flows to a backup NVMe target. However, there are some significant drawbacks to such methods. There is increased complexity and costs due to the addition of at least one backup NVMe target, which adds additional components, additional connections, and additional overhead to configure, manage, and operate.

Embodiments herein include systems and methods that resolve the interrupt event issues but reduce complexity, underutilization of resources, and costs as compared with other approaches. Embodiments keep a host unaware of an NVMe target interrupt/reboot and remove the need for TCP reestablishment. Furthermore, embodiments for TCP connection protection do not require rebalancing of the load, do not require standby configuration, and protect against multiple failures.

Figure 3:
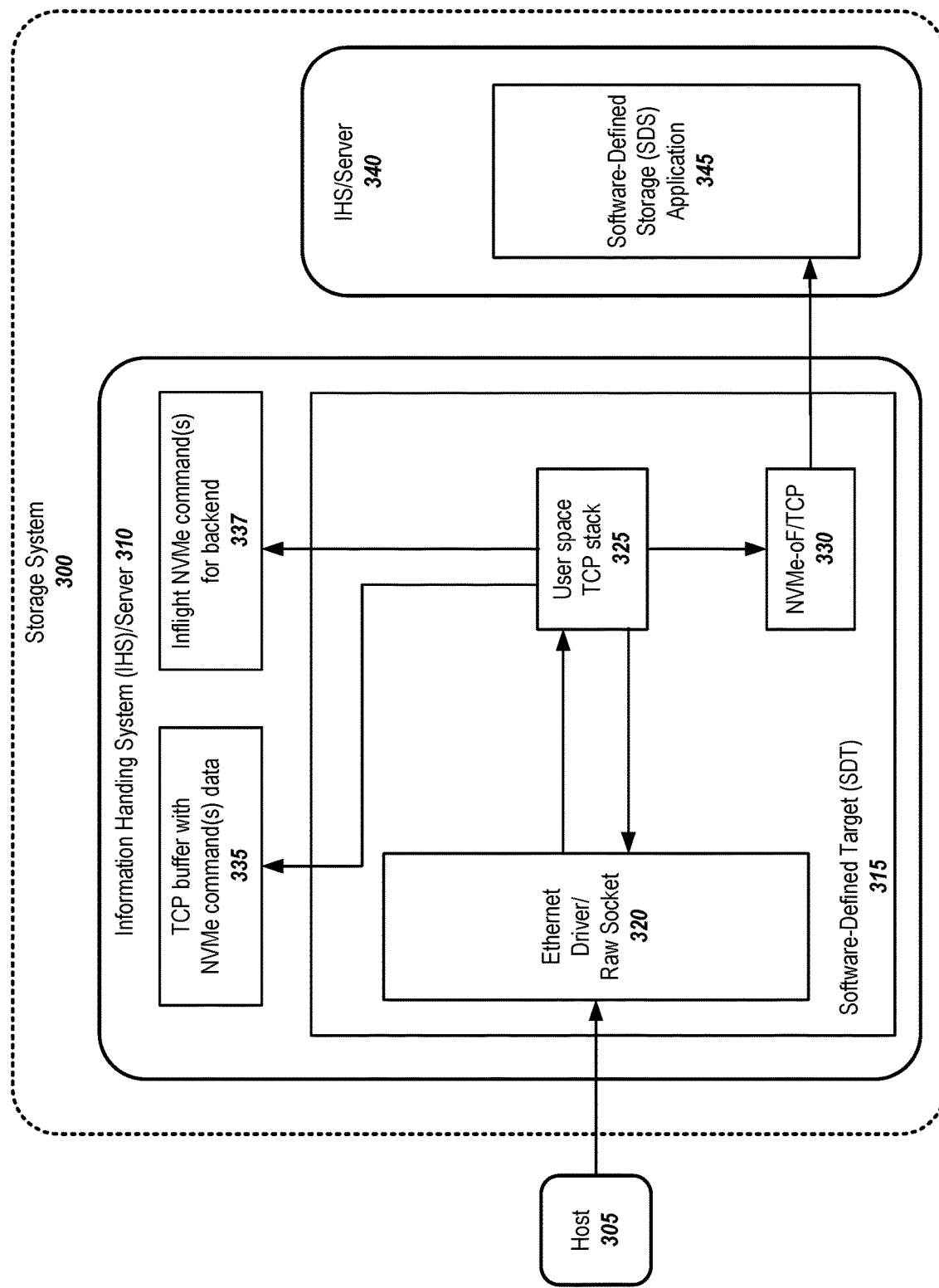
FIG. 3 depicts a storage system, according to embodiments of the present disclosure.

FIG. 3 depicts a storage system, according to embodiments of the present disclosure. In one or more embodiments, a storage system 300 comprises a target system 315, one or more buffers (e.g., buffers 335 and 337), and a backend system 340. As illustrated, the target 315, which may be a software-defined NVMe target, may comprise an Ethernet driver/Sockets 320 for interfacing with one or more hosts (e.g., host 305), user space/customized TCP stack 325 that interfaces with the one or more buffers and with a NVMe-oF/TCP component that interfaces with the backend 340. In one or more embodiments, the backend system 340 may comprise or may be implemented as a software-defined storage application 345.

Embodiments herein include systems and methods that resolve the interrupt event issues but reduce As will be illustrated in more detail below, embodiments utilize the feature of TCP protocol to acknowledge received data from the host. If the data is not acknowledged, the host will retransmit it. In one or more embodiments, the NVMe target 215 saves one or more parameters related to NVMe data, such as controller state data and TCP state data of its end in a memory mapped file or in shared memory region (e.g., buffer 335, buffer 337, or both). In one or more embodiments, the NVMe target 315 may save controller ID, configuration and status registers, host provided Keepalive timeout, and data related to TCP association with a given host, all corresponding TCP connections, and its states and inflight NVMe command states over those connections. In one or more embodiments, the NVMe target 315 may also save advertised namespaces for given TCP association, although such mappings may be provided from a centralized configuration after reboot thereby negating a need for the target 315 to separately maintain such information.

TCP operates using TCP Sequence (SEQ) numbers and Acknowledgement (ACK) numbers to enable reliable data transfer for TCP streams. The SEQ number is sent by the host and it indicates how much data has been sent for the session. This may also be referred to as the byte-order number. The ACK number is sent by the target, which indicates to the host that the target has received cumulated data and is ready for the next segment. In TCP, if an ACK is not received, the host will retransmit the associated data. In one or more embodiments, by utilizing data stored in one or more buffers (e.g., buffer 335, buffer 337, or both), when an interrupt event (e.g., a crash and reboot) occurs, the rebooted/new instance target uses the saved TCP connection state of the controller side—including all its saved SEQ and ACK numbers and source and destination TCP ports. Since the TCP state remains active on the host, the rebooted/new instance target appears to be equivalent to the pre-interrupt target from the point of view of the host.

In one or more embodiments, a typical operating system (OS) TCP/IP stack may not be sufficient for implementing functionality described herein. Accordingly, as illustrated in FIG. 3, a user space custom TCP/IP stack running directly over Ethernet (e.g., raw Linux socket), including user space ARP (Address Resolution Protocol), may be used. In one or more embodiments, a custom TCP/IP stack may have full control on SEQ and ACK numbers that are sent over TCP connection; and since a typical OS TCP/IP stack is not being used, the custom TCP/IP stack may have ARP access as well. It should be noted that, the ARP information allows a storage target to know what Ethernet interface packets should be sent to.

As noted above, in one or more embodiments, the storage target 315 maintains a set of parameters, such as controller ID and controller state corresponding to TCP association, and the storage target may maintain advertised volume mappings for given TCP association unless this information is distributed from centralized configuration server as a part of initial configuration upon reboot. In one or more embodiments, the storage target may maintain IO related data, incomplete TCP flows and assembled NVMe packets for IOs inflight in a buffer or buffers (e.g., separate memory mapped file or shared memory). In one or more embodiments, the NVMe target 315 may clean this inflight IO related data in conjunction with a reply being delivered to the host (e.g., via TCP ACK). Note that, in one or more embodiments, the buffer(s) (e.g., buffer 335 and buffer 337) maintain the NVMe data and associated parameters such that it survives the target's interrupt event (e.g., survives a crash and reboot). Thus, the buffer(s) may be external to the target 315.

FIG. 4 depicts a single controller saved memory layout, according to embodiments of the present disclosure. It shall be noted that all connected controllers and TCP states may be saved in a similar manner—although different fields and/or different layouts may be used.

Each NVMe queue has associated TCP connection. Therefore, in one or more embodiments, per each queue, admin, or 10, there may be a portion of TCP header information—incomplete NVMe command TCP stream that is acknowledged to the host is stored in a memory (e.g., TCP command with NVMe command data buffer), and a list of inflight NVMe commands (e.g., outstanding IOs to backend storage) with Scatter-Gather-List memory layout may be stored in the second buffer.

In one or more embodiments, incomplete NVMe commands may be handled differently than complete NVMe commands. In one or more embodiments, an NVMe data fragment that has not been assembled yet in terms of TCP flow may be deemed an incomplete NVMe command or a fragment, and those NVMe data fragments that have been assembled may considered a full NVME command. Full commands are ready for processing by the backend storage but have not yet successfully been processed by the backend storage (e.g., a reply was not received and processed), and such full commands may be considered "inflight" commands. Those two sets of data (NVMe data fragments and inflight NVMe commands) may be stored separately. For example, in one or more embodiments, incomplete NVMe command data may be stored in a TCP buffer with NVMe command data buffer 335 and full NVMe commands may be stored in an Inflight NVMe command(s) buffer 337. In one or more embodiments, commands that are incomplete in TCP terms may be handled by NVMe TCP transport after system reboot, in which additional TCP stream data to complete the NVMe command is expected from the host. And, in one or more embodiments, commands that are fully assembled and are inflight to backend storage may be handled by the rebooted storage target 315, in which the command is send to the backend system 345. It shall be noted that the memory layout is a matter of implementation. The buffers may be combined into a single buffer, in which a field indicates whether the NVMe data represents a full command or a fragment. Furthermore, implementations of such shared memory may include (but are not limited to) an in-memory database with transaction protection to ensure coherency.

Figure 5:
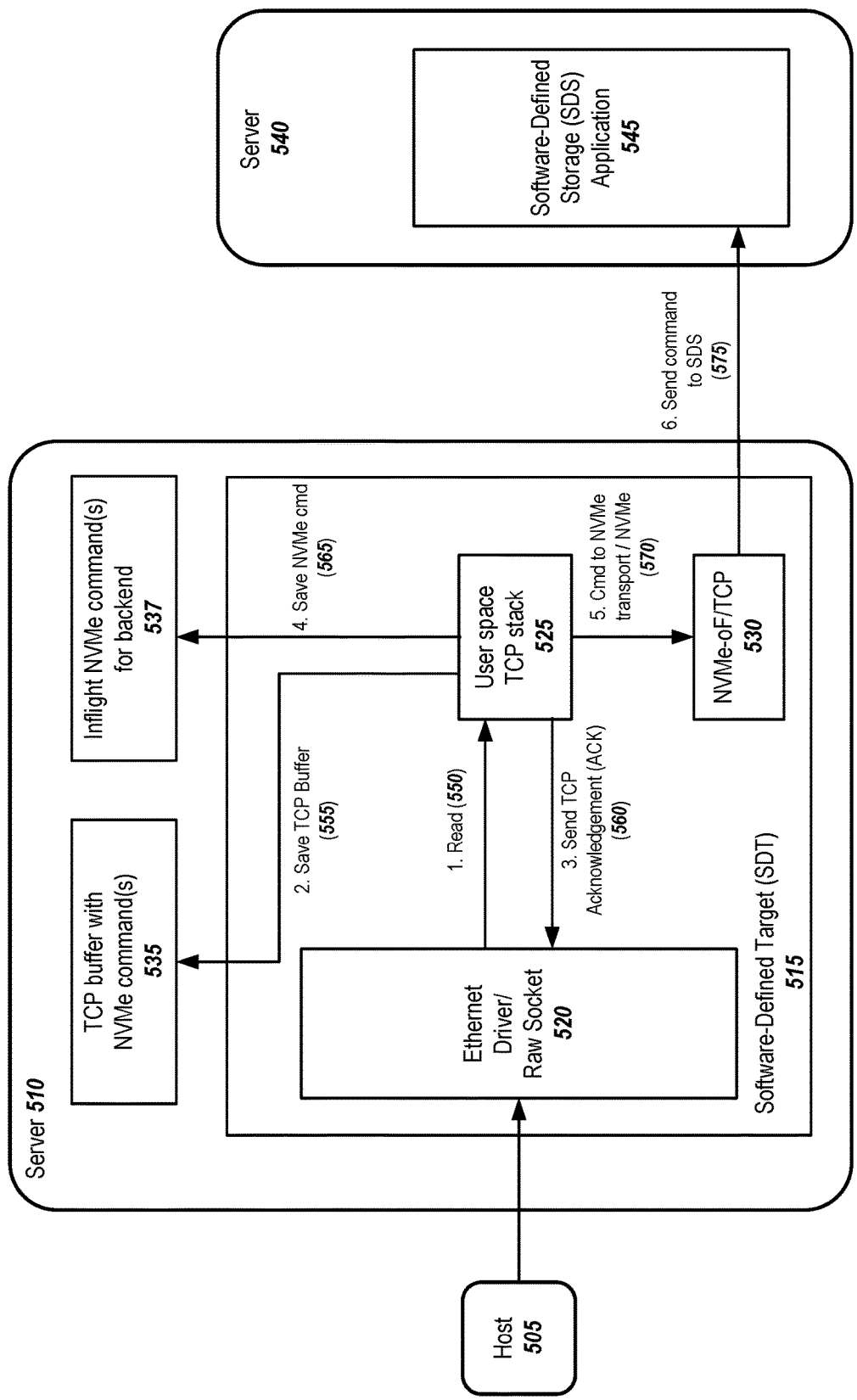
FIG. 5 depicts a system and methodology for normal processing, according to embodiments of the present disclosure.

FIG. 5 depicts a system and example methodology for normal processing, according to embodiments of the present disclosure. In the depicted example, NVMe over TCP (NVMe/TCP) data is received at the storage target 515, which may be a software-defined target (SDT), from a host 505.

The data may be received at a socket/Ethernet driver 520 of the SDT 315 and is read (550) by a user space/customized TCP stack 525, which causes information related to the NVMe/TCP data to be stored into at least one of the buffers. In one or more embodiments, if the NVMe/TCP data is a fragment of a command, the custom TCP stack 525 causes the information related to the NVMe/TCP data to be stored in buffer 535. As noted above, in one or more embodiments, this information may include parameter data to recreate the NVMe controller and TCP connection(s) and may include the NVMe/TCP command data. In one or more embodiments, if the NVMe/TCP data is a full command or forms a full command, the TCP stack 525 may cause the information related to the NVMe/TCP data to be stored in buffer 537 and sent (570, 575) to the backend 545 via NVMe transport module 530. Alternatively, or additionally, each received NVMe/TCP data unit may, regardless of whether it is a full command or makes a full command when combined with other fragments, may have information stored in buffer 535. In yet alternative embodiments, if the received NVMe/TCP data is a full command or forms a full NVMe command when combined with other fragments, the data may be removed from the first buffer 535 and stored in the inflight buffer 537, as well as being sent to the backend 545.

As noted in FIG. 5, the SDT 515 returns (560) an acknowledgement (ACK) to the host. It shall be noted that the ACK may be sent at different times in different embodiments. For example, sending (560) a TCP acknowledgement corresponding to the NVMe/TCP data may be done: (1) after storing the information related to the NVMe/TCP data in the first buffer 535; (2) after forming a full NVMe command using the NVMe/TCP data; (3) after moving the full NVMe command to the inflight buffer 537; (4) after removing the full NVMe command from the first buffer 535; or (5) after the full NVMe command is send to the backend 545—depending upon the embodiment. It should be noted that, in one or more embodiments, a TCP acknowledgement will be sent once the information related to the NVMe/TCP data has been stored in a buffer, because the SDT needs to let the host know to send the next NVMe/TCP data in the stream, if any.

Figure 6:
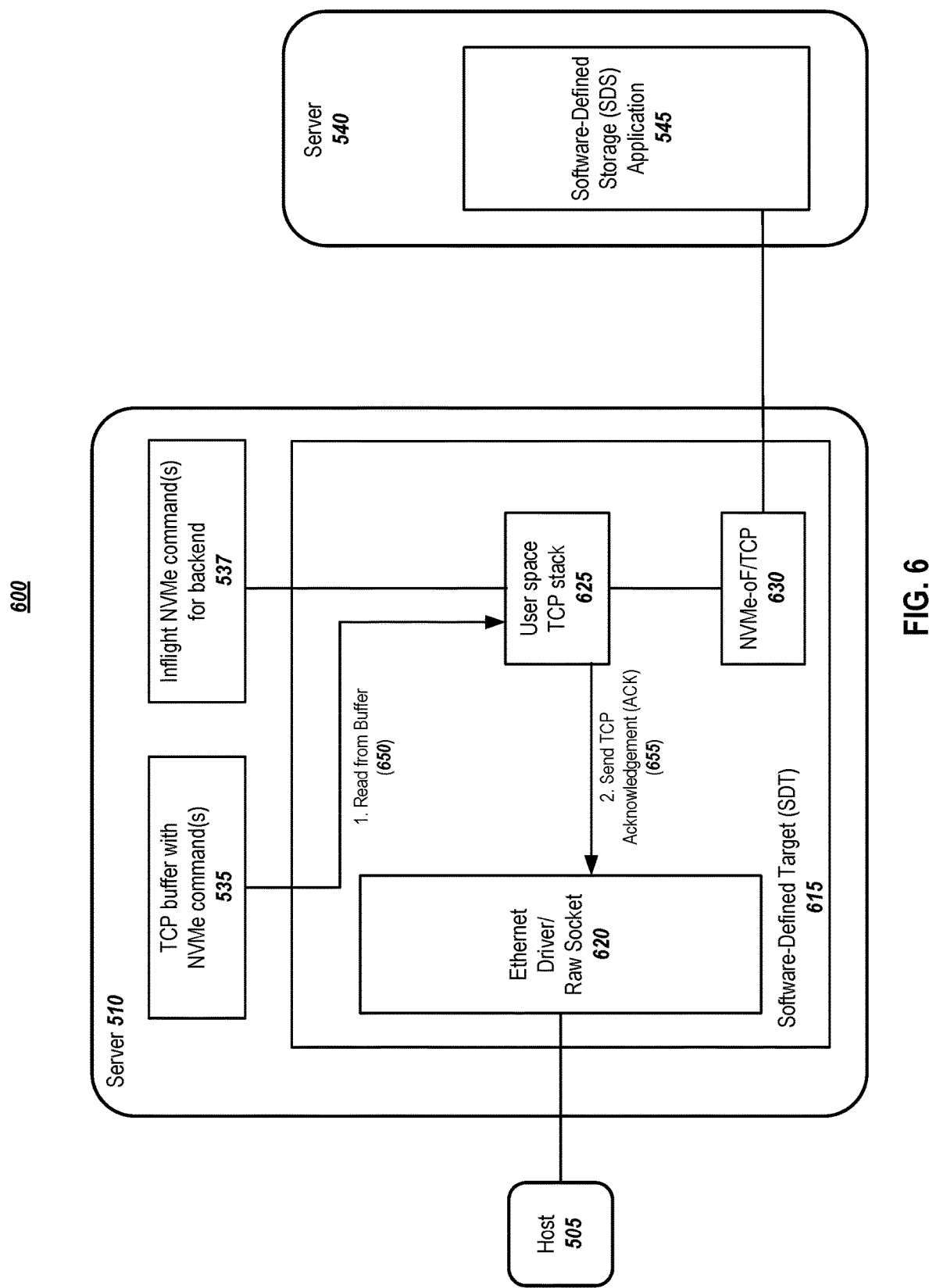
FIG. 6 depicts an example flow when an interrupt event has occurred at the storage target, according to embodiments of the present disclosure.

FIG. 6 depicts an example flow when an interrupt event has occurred at the storage target, according to embodiments of the present disclosure. Following an interrupt event (such as loss of connectivity or crash) and reboot, a new NVMe target 615 is instantiated and reads (650) saved information from at least one of the buffers 535, 537 to recreate the NVMe controller with saved parameters that recorded the old controller state (e.g., controller ID, controller configuration and status registers, host configured keepalive timeout value, etc.). The new NVMe target 615 uses the saved information to recreate the controller and its TCP association that were allocated before the crash during TCP association establishment, obtains connection control blocks from the buffer (which may be a memory mapped file or shared memory), and continues packet exchange without new connection setup. Furthermore, source port, destination port, sequence number, ACK number of acknowledged data, flags and window size may all be restored for the TCP header.

Note that, in one or more embodiments, the new NVMe target 615 uses precrash TCP connection SEQ and ACK numbers. That is, the NVMe target checks at least one of the one or more buffers to determine a last NVMe/TCP data for which a TCP acknowledgement corresponding to that last NVMe/TCP data was successfully sent to the host. By resending (655) to the host the TCP acknowledgement corresponding to that last NVMe/TCP data, it causes the host to send NVMe/TCP data that follows the last NVMe/TCP data, if any. Data that the host sent during NVMe target down time, which was lost (and not acknowledged), will be re-sent. Thus, the host 505 does not notice that the target had an interrupt event and was restarted. From host perspective, all TCP connections are still up and running. TCP protocol keepalive timeout is long enough (typically minutes long) so the storage target restart will not cause the host to drop connection(s) due to no replies coming from the storage target. While the host may resend some data, the host may resent data in normal course (e.g., due to dropped packets or other reasons), so from the host perspective the target has not changed. One skilled in the art shall recognize that embodiments provide quick and efficient remedies for resuming normal operations.

Note that TCP state information is not known on network nodes between host and the storage target—they merely forward Ethernet packets or IP packets. Therefore, there is no need to worry about the new target relative to the network nodes.

Figure 7:
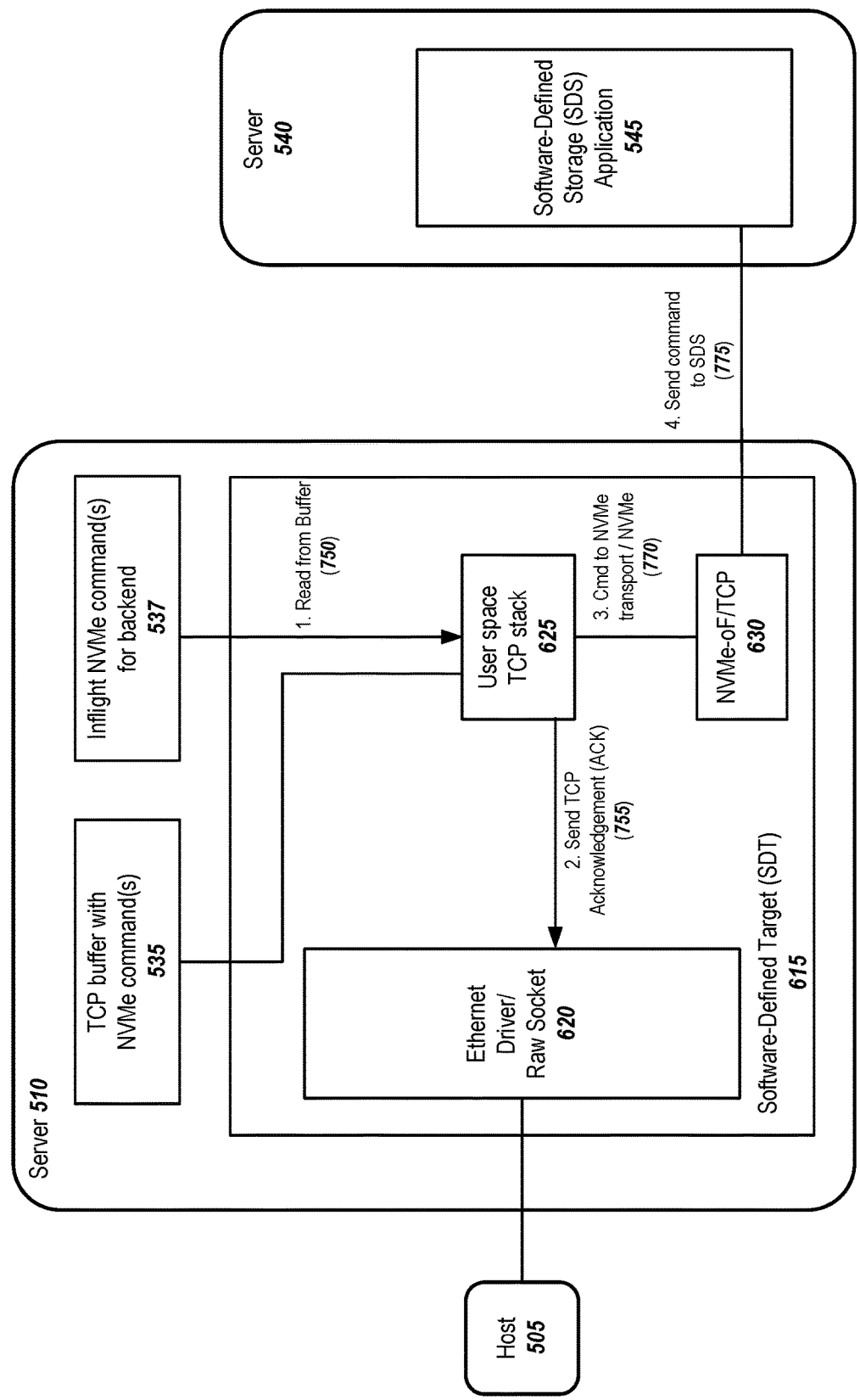
FIG. 7 depicts another example flow when an interrupt event has occurred at the storage target, according to embodiments of the present disclosure.

FIG. 7 depicts another example flow when an interrupt event has occurred at the storage target, according to embodiments of the present disclosure. Because interrupt events may occur at any time, the restarted storage target 615 may restart with different conditions. FIG. 6 is applicable to embodiments in which the NVMe/TCP data was an incomplete command—although, depending upon the embodiment, it may be applicable in other situations. The flow in FIG. 7 may be considered when dealing with complete NVMe commands. For example, following receipt of NVMe/TCP data, which data may be a full (or complete) command or may be the final fragment that, when combined with previously received data, forms a complete NVMe command, a crash occurs. The crash may have occurred when the NVMe/TCP data was stored in the first buffer 535, during the process of forming the full NVMe command, or when the full NVMe command was stored in the inflight buffer 537, for example.

In one or more embodiments, when the new storage target 615 reboots, it reads saved information from at least one of the buffers 535, 537 to recreate the NVMe controller and TCP connection and resumes processing. If the NVMe/TCP data is in the first buffer, the full NVMe command may be moved to the inflight buffer 537 by either moving data from the NVMe/TCP data that comprises a full NVMe command (if the NVMe/TCP data comprises a full NVMe command) or by first combining data from the NVMe/TCP data with previously received data to form the full NVMe command (if the NVMe/TCP data comprises the last fragment of the full NVMe command). The storage target takes the NVMe command from the inflight buffer 537 and sends it (770, 775) to the backend 545. After reboot, the NVMe target is ready to accept outstanding NVMe commands and replies with its data, if any, coming into corresponding Scatter-Gather-Lists. For example, in one or more embodiments, when the storage target sends requests to the backend storage server, it provides list buffers (e.g., Scatter Gather List) where data is to be copied from the backend storage, or from where data should be written to backend storage. In one or more embodiments, information about the Scatter Gather List buffers may be part of the records stored in the inflight buffer 537. In practice, the host may experience a short (e.g., 1-2 seconds) additional delay for those IOs that are inflight for the storage target, but such delays are minimal compared to having to fully reestablish TCP connection like under prior approaches. Note that, in one or more embodiments, the storage target checks at least one of the one or more buffers to determine the last NVMe/TCP data for which a TCP acknowledgement was successfully sent to the host, which should be in the NVMe/TCP data used in the inflight command. By resending (755) to the host the TCP ACK corresponding to that NVMe/TCP data, the host will resend any subsequently sent NVMe/TCP data that was not successfully received by the storage target.

Figure 8:
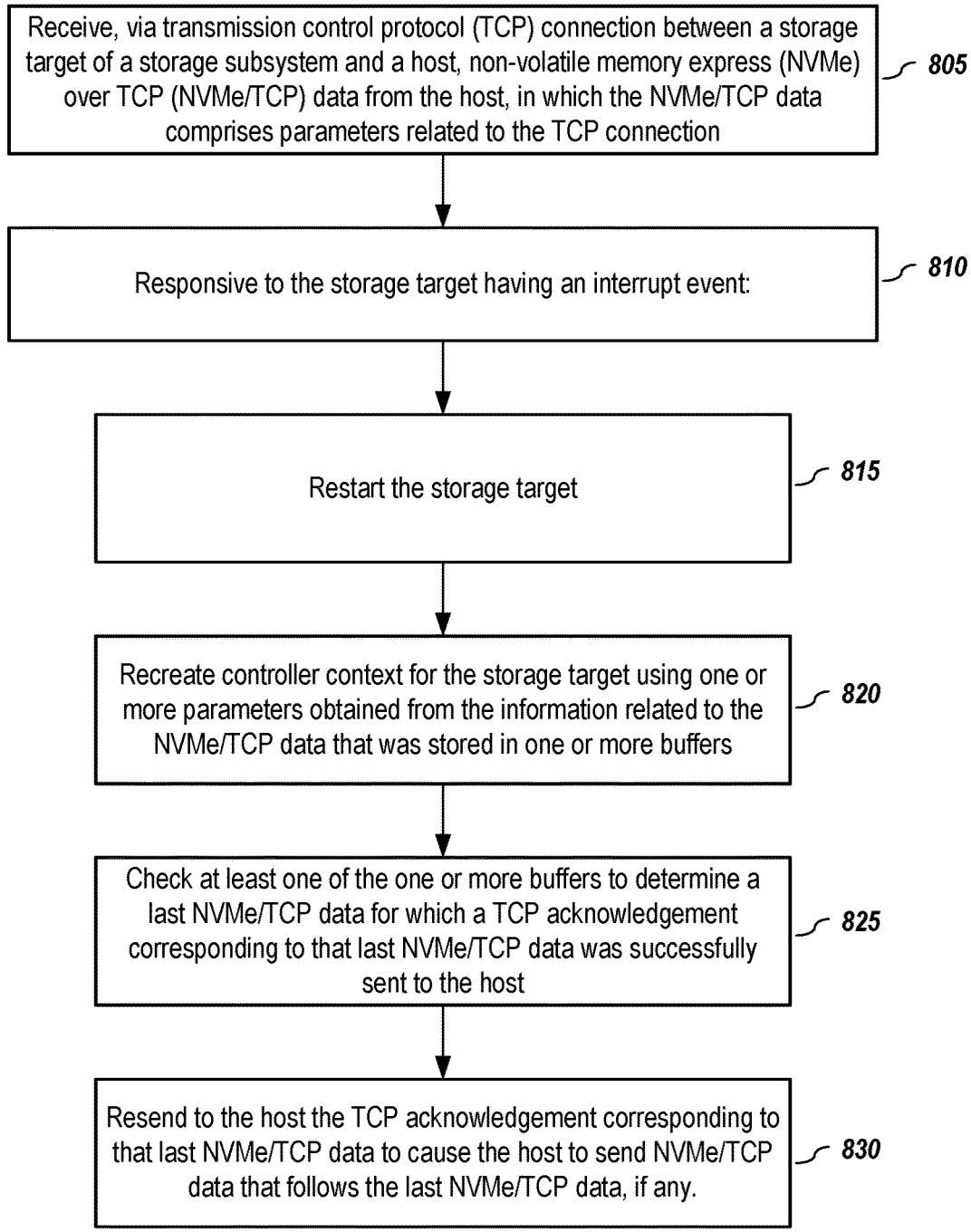
FIG. 8 depicts a general methodology for handling an interrupt event at a storage target, according to embodiments of the present disclosure.

FIG. 8 depicts a general methodology for handling an interrupt event at a storage target, according to embodiments of the present disclosure. In one or more embodiments, a storage target receives (805), via transmission control protocol (TCP) connection between the storage target of a storage subsystem and a host, NVMe/TCP data from the host, in which the NVMe/TCP data comprises parameters related to the TCP connection. Responsive to the storage target having (810) an interrupt event before finishing storing information related to the NVMe/TCP data in one or more buffers, the storage target is restarted (815). The restarted storage target recreates (820) controller context for the storage target using one or more parameters obtained from information related to the NVMe/TCP data that was stored in at least one of the one or more buffers. In one or more embodiments, the information related to the NVMe/TCP data that was stored in at least one of the buffers that is used by the restarted storage target to recreate the controller context (e.g., the NVMe controller and TCP connection contexts) may be obtained from one or more prior NVMe/TCP data units that were received by the storage target and was saved or from saved configuration/context information. As noted above, restarting the storage target may comprise starting or forming a new instance of the storage target, and by recreating controller context for the storage target using one or more parameters obtained from the information related to the NVMe/TCP data, the new instance of the storage target is operationally equivalent to the host as the storage target that suffered an interrupt event.

In one or more embodiments, the storage target checks (825) at least one of the buffers to determine a last NVMe/TCP data for which a TCP acknowledgement corresponding to that last NVMe/TCP data was successfully sent to the host, and resends (830) to the host the TCP acknowledgement corresponding to that last NVMe/TCP data to cause the host to send NVMe/TCP data that follows the last NVMe/TCP data, if any. It shall be noted that sending the ACK may be done at various times depending upon the embodiment, including (but not limited to) after storing the information related to the last NVMe/TCP data in a first buffer, after moving a full NVMe command formed using the last NVMe/TCP data to the inflight buffer, after removing the full NVMe command from the first buffer, or at other times.

Figure 9:
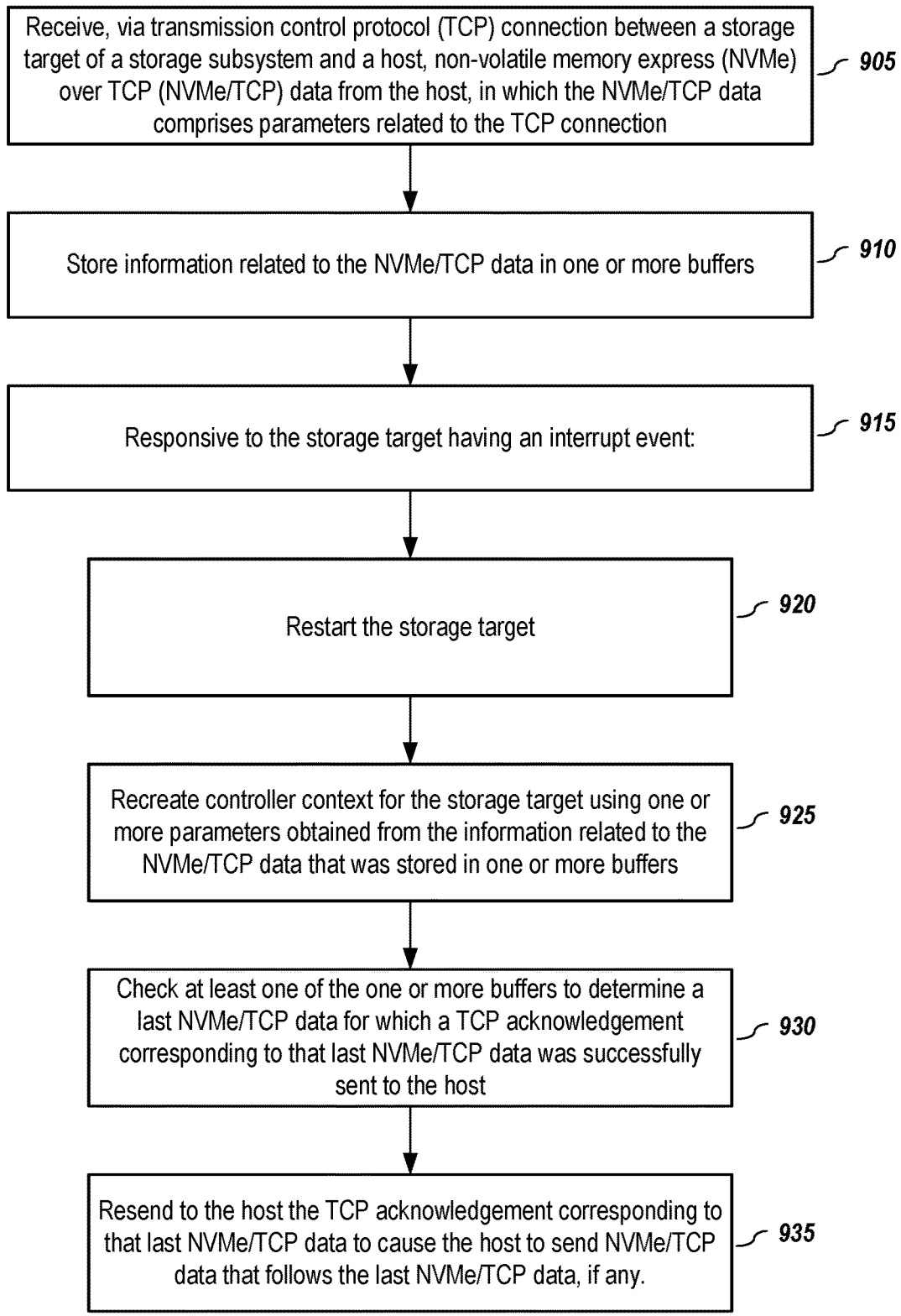
FIG. 9 depicts another general methodology for handling an interrupt event at a storage target, according to embodiments of the present disclosure.

FIG. 9 depicts another general methodology for handling an interrupt event at a storage target, according to embodiments of the present disclosure. In one or more embodiments, a storage target receives (905), via transmission control protocol (TCP) connection between the storage target of a storage subsystem and a host, NVMe/TCP data from the host, in which the NVMe/TCP data comprises parameters related to the TCP connection. The storage target may then store (910) information related to the NVMe/TCP data in one or more buffers. It shall be noted that at least some of the information related to the NVMe controller and/or TCP connection may have been previously stored.

Responsive to the storage target having (915) an interrupt event, the storage target is restarted (920) and recreates (925) the controller context for the storage target using one or more parameters obtained from the information related to the NVMe/TCP data that was stored in one or more buffers. Recreation of the storage target may be performed in like manner as described previously.

In one or more embodiments, the storage target checks (930) at least one of the one or more buffers to determine a last NVMe/TCP data for which a TCP acknowledgement corresponding to that last NVMe/TCP data was successfully sent to the host, and resends (935) to the host the TCP ACK corresponding to that last NVMe/TCP data to cause the host to send NVMe/TCP data that follows the last NVMe/TCP data, if any.

In one or more embodiments, in response to the NVMe/TCP data comprising a full NVMe command and having not been successfully submitted to a backend storage system, the storage target submits the full NVMe command to the backend storage system. As noted previously, in one or more embodiments, in response to the NVMe/TCP data being a final fragment that forms a full NVMe command when combined with one or more prior fragments received by the storage target, the storage target may move the full NVMe command to an inflight buffer, remove the full NVMe command from the first buffer, and submit the full NVMe command to a backend storage system.

B. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 10:
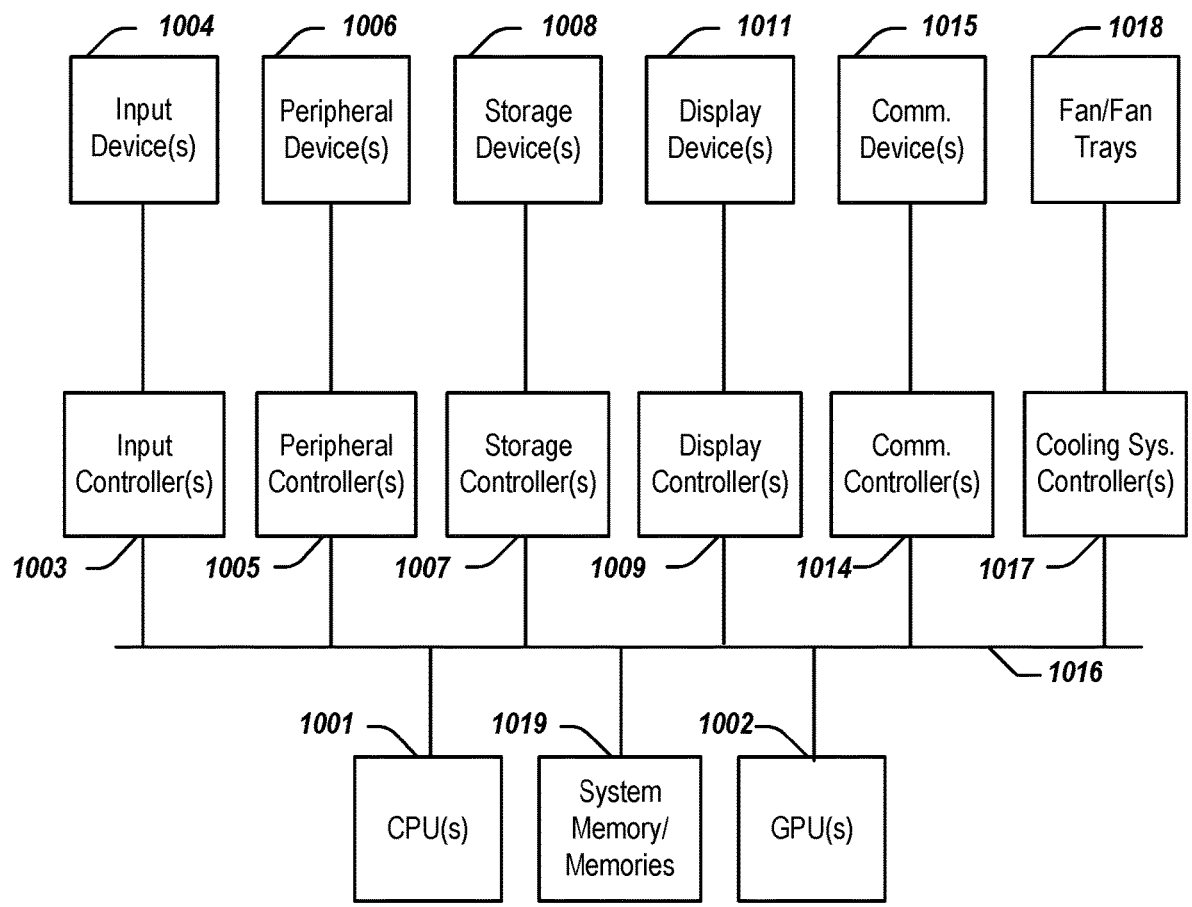
FIG. 10 depicts a simplified block diagram of an information handling system, according to embodiments of the present disclosure.

FIG. 10 depicts a simplified block diagram of an information handling system (or computing system), according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more CPUs 1001 that provides computing resources and controls the computer. CPU 1001 may be implemented with a microprocessor or the like and may also include one or more graphics processing units (GPU) 1002 and/or a floating-point coprocessor for mathematical computations. In one or more embodiments, one or more GPUs 1002 may be incorporated within the display controller 1009, such as part of a graphics card or cards. The system 1000 may also include a system memory 1019, which may comprise RAM, ROM, or both.

A number of controllers and peripheral devices may also be provided, as shown in FIG. 10. An input controller 1003 represents an interface to various input device(s) 1004, such as a keyboard, mouse, touchscreen, stylus, microphone, camera, trackpad, display, etc. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT) display, a thin film transistor (TFT) display, organic light-emitting diode, electroluminescent panel, plasma panel, or any other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1000 comprises one or more fans or fan trays 1018 and a cooling subsystem controller or controllers 1017 that monitors thermal temperature(s) of the system 1000 (or components thereof) and operates the fans/fan trays 1018 to help regulate the temperature.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 11:
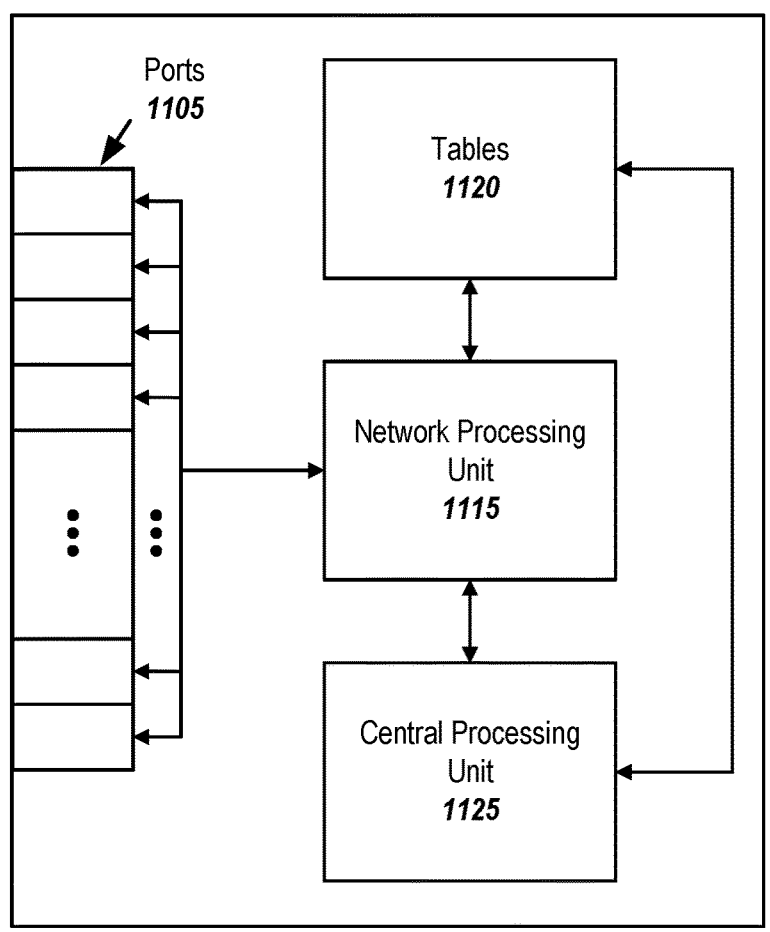
FIG. 11 depicts an alternative block diagram of an information handling system, according to embodiments of the present disclosure.

FIG. 11 depicts an alternative block diagram of an information handling system, according to embodiments of the present disclosure. It will be understood that the functionalities shown for system 1100 may operate to support various embodiments of the present disclosure—although it shall be understood that such system may be differently configured and include different components, additional components, or fewer components.

The information handling system 1100 may include a plurality of I/O ports 1105, a network processing unit (NPU) 1115, one or more tables 1120, and a CPU 1125. The system includes a power supply (not shown) and may also include other components, which are not shown for sake of simplicity.

In one or more embodiments, the I/O ports 1105 may be connected via one or more cables to one or more other network devices or clients. The network processing unit 1115 may use information included in the network data received at the node 1100, as well as information stored in the tables 1120, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An information-handling-system-implemented method comprising:
   receiving, via transmission control protocol (TCP) connection between a storage target of a storage subsystem and a host, non-volatile memory express (NVMe) over TCP (NVMe/TCP) data from the host, in which the NVMe/TCP data comprises parameters related to the TCP connection;
   storing information related to the NVMe/TCP data in one or more buffers; and
   responsive to the storage target having an interrupt event:
      restarting the storage target;
      recreating controller context for the storage target using one or more parameters obtained from the information related to the NVMe/TCP data that was stored in one or more buffers;
      checking at least one of the one or more buffers to determine a last NVMe/TCP data for which a TCP acknowledgement corresponding to that last NVMe/TCP data was successfully sent to the host; and
      resending to the host the TCP acknowledgement corresponding to that last NVMe/TCP data to cause the host to send NVMe/TCP data that follows the last NVMe/TCP data, if any.

2. The information-handling-system-implemented method of claim 1 further comprising:
   responsive to the NVMe/TCP data comprising a full NVMe command and having not been successfully submitted to a backend storage system, submitting the full NVMe command to the backend storage system.

3. The information-handling-system-implemented method of claim 1 wherein the information related to the NVMe/TCP data is initially stored in a first buffer and the method further comprises:
   responsive to the NVMe/TCP data being a final fragment that forms a full NVMe command when combined with one or more prior fragments received by the storage target:
      moving the full NVMe command to an inflight buffer and removing the full NVMe command from the first buffer; and
      submitting the full NVMe command to a backend storage system.

4. The information-handling-system-implemented method of claim 1 further comprising:
   sending a TCP acknowledgement corresponding to the NVMe/TCP data:
      after storing the information related to the NVMe/TCP data in a first buffer from the one or more buffers;
      after forming a full NVMe command using the NVMe/TCP data;
      after moving the full NVMe command to an inflight buffer from the one or more buffers; or
      after removing the full NVMe command from the first buffer.

5. The information-handling-system-implemented method of claim 1 wherein the storage subsystem comprises the storage target and a backend storage and wherein the storage target is a software-defined storage target and the backend storage is a software-defined storage application.

6. The information-handling-system-implemented method of claim 5 wherein the one or more buffers maintain information stored in the one or more buffers even if the software-defined storage target has an interrupt event.

7. The information-handling-system-implemented method of claim 1 wherein:
   restarting the storage target comprises forming a new instance of the storage target, and by recreating controller context for the storage target using one or more parameters obtained from the information related to the NVMe/TCP data, the new instance of the storage target is operationally equivalent to the host as the storage target that suffered an interrupt event.

8. An information-handling-system-implemented method comprising:
   receiving, via transmission control protocol (TCP) connection between a storage target of a storage subsystem and a host, non-volatile memory express (NVMe) over TCP (NVMe/TCP) data from the host, in which the NVMe/TCP data comprises parameters related to the TCP connection; and
   responsive to the storage target having an interrupt event before finishing storing information related to the NVMe/TCP data in one or more buffers:
      restarting the storage target;
      recreating controller context for the storage target using one or more parameters obtained from information related to the NVMe/TCP data that was stored in at least one of the one or more buffers;
      checking at least one of the one or more buffers to determine a last NVMe/TCP data for which a TCP acknowledgement corresponding to that last NVMe/TCP data was successfully sent to the host; and
      resending to the host the TCP acknowledgement corresponding to that last NVMe/TCP data to cause the host to send NVMe/TCP data that follows the last NVMe/TCP data, if any.

9. The information-handling-system-implemented method of claim 8 wherein the information related to the NVMe/TCP data that was stored in at least one of the one or more buffers was obtained from a prior NVMe/TCP data that received by the storage target and was saved into at least one of the one or more buffers.

10. The information-handling-system-implemented method of claim 8 wherein the TCP acknowledgement for the last NVMe/TCP data was sent to the host:
    after storing the information related to the last NVMe/TCP data in a first buffer;
    after moving a full NVMe command formed using the last NVMe/TCP data to an inflight buffer; or
    after removing the full NVMe command from the first buffer.

11. The information-handling-system-implemented method of claim 8 wherein the storage subsystem comprises the storage target and a backend storage and wherein the storage target is a software-defined storage target and the backend storage is a software-defined storage application.

12. The information-handling-system-implemented method of claim 11 wherein the one or more buffers maintain information stored in the one or more buffers even if the software-defined storage target has an interrupt event.

13. The information-handling-system-implemented method of claim 8 wherein:
restarting the storage target comprises forming a new instance of the storage target, and by recreating controller context for the storage target using one or more parameters obtained from the information related to the NVMe/TCP data, the new instance of the storage target is operationally equivalent to the host as the storage target that suffered an interrupt event.

14. An information handling system comprising:
one or more processors; and
a non-transitory computer-readable medium or media comprising one or more sets of instructions which, when executed by at least one of the one or more processors, causes steps to be performed comprising:
receiving, via transmission control protocol (TCP) connection between a storage target of a storage subsystem and a host, non-volatile memory express (NVMe) over TCP (NVMe/TCP) data from the host, in which the NVMe/TCP data comprises parameters related to the TCP connection;
storing information related to the NVMe/TCP data in one or more buffers; and
responsive to the storage target having an interrupt event:
restarting the storage target;
recreating controller context for the storage target using one or more parameters obtained from the information related to the NVMe/TCP data that was stored in one or more buffers;
checking at least one of the one or more buffers to determine a last NVMe/TCP data for which a TCP acknowledgement corresponding to that last NVMe/TCP data was successfully sent to the host; and
resending to the host the TCP acknowledgement corresponding to that last NVMe/TCP data to cause the host to send NVMe/TCP data that follows the last NVMe/TCP data, if any.

15. The information handling system of claim 14 wherein the non-transitory computer-readable medium or media further comprises one or more sequences of instructions which, when executed by at least one of the one or more processors, causes steps to be performed comprising:
responsive to the NVMe/TCP data comprising a full NVMe command and having not been successfully submitted to a backend storage system, submitting the full NVMe command to the backend storage system.

16. The information handling system of claim 14 wherein the information related to the NVMe/TCP data is initially stored in a first buffer and the non-transitory computer-readable medium or media further comprises one or more sequences of instructions which, when executed by at least one of the one or more processors, causes steps to be performed comprising:
responsive to the NVMe/TCP data being a final fragment that forms a full NVMe command when combined with one or more prior fragments received by the storage target:
moving the full NVMe command to an inflight buffer and removing the full NVMe command from the first buffer; and
submitting the full NVMe command to a backend storage system.

17. The information handling system of claim 14 wherein the non-transitory computer-readable medium or media further comprises one or more sequences of instructions which, when executed by at least one of the one or more processors, causes steps to be performed comprising:
sending a TCP acknowledgement corresponding to the NVMe/TCP data:
after storing the information related to the NVMe/TCP data in a first buffer from the one or more buffers;
after forming a full NVMe command using the NVMe/TCP data;
after moving the full NVMe command to an inflight buffer from the one or more buffers; or
after removing the full NVMe command from the first buffer.

18. The information handling system of claim 14 wherein the storage subsystem comprises the storage target and a backend storage and wherein the storage target is a software-defined storage target and the backend storage is a software-defined storage application.

19. The information handling system of claim 18 wherein the one or more buffers maintain information stored in the one or more buffers even if the software-defined storage target has an interrupt event.

20. The information handling system of claim 14 wherein:
restarting the storage target comprises forming a new instance of the storage target, and by recreating controller context for the storage target using one or more parameters obtained from the information related to the NVMe/TCP data the new instance of the storage target is operationally equivalent to the host as the storage target that suffered an interrupt event.

\* \* \* \* \*